US008959069B2

(12) United States Patent
Channing et al.

(10) Patent No.: US 8,959,069 B2
(45) Date of Patent: *Feb. 17, 2015

(54) DYNAMIC CONFIGURATION OF A PERSISTENCE PROVIDER

(75) Inventors: Christopher E. Channing, Austin, TX (US); Glenn E. Goldenberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/449,043

(22) Filed: Apr. 17, 2012

(65) Prior Publication Data

US 2012/0203735 A1     Aug. 9, 2012

Related U.S. Application Data

(63) Continuation of application No. 12/894,045, filed on Sep. 29, 2010.

(51) Int. Cl.
*G06F 7/00* (2006.01)
*G06F 17/30* (2006.01)

(52) U.S. Cl.
CPC .................................. *G06F 17/3041* (2013.01)
USPC ........................................................ 707/703

(58) Field of Classification Search
CPC .................... G06F 17/30144; G06F 17/30174; G06F 17/30575
USPC ........................................................ 707/703
See application file for complete search history.

(56) References Cited

U.S. PATENT DOCUMENTS

| 5,615,362 | A | | 3/1997 | Jensen et al. |
| 5,706,506 | A | | 1/1998 | Jensen et al. |
| 6,009,440 | A | * | 12/1999 | Watson et al. ........................ 1/1 |
| 6,016,495 | A | * | 1/2000 | McKeehan et al. ........... 707/703 |
| 6,163,776 | A | | 12/2000 | Periwal |
| 6,609,132 | B1 | | 8/2003 | White et al. |
| 6,618,732 | B1 | * | 9/2003 | White et al. .................. 707/769 |
| 6,618,733 | B1 | | 9/2003 | White et al. |
| 6,769,124 | B1 | * | 7/2004 | Schoening et al. ........... 719/316 |
| 6,839,718 | B2 | | 1/2005 | Heddings et al. |
| 7,117,214 | B2 | * | 10/2006 | Wiser et al. .................... 719/316 |
| 7,305,672 | B2 | * | 12/2007 | Vincent ........................ 717/172 |
| 7,349,912 | B2 | | 3/2008 | Delany et al. |
| 7,426,523 | B2 | | 9/2008 | Schroeder et al. |

(Continued)

OTHER PUBLICATIONS

Preliminary Amendment, Apr. 17, 2012, for U.S. Appl. No. 12/894,045, filed Sep. 29, 2010 by C.E. Channing et al., Total 6 pp. [57.231 (PrelimAmend)].

(Continued)

*Primary Examiner* — Rehana Perveen
*Assistant Examiner* — Mark E Hershley
(74) *Attorney, Agent, or Firm* — Janaki K. Davda; Konrad, Raynes, Davda & Victor LLP (57) ABSTRACT

Provided are techniques for updating a physical data structure type. A persistence provider is updated with dynamic configuration data for the updated physical data structure type while an application is executing. The application that is executing is allowed to access the updated physical data structure type using the updated persistence provider to map an application level object type to the updated physical data structure type without restarting the application.

7 Claims, 9 Drawing Sheets

(56) References Cited

U.S. PATENT DOCUMENTS

| | | | |
|---|---|---|---|
| 7,680,879 B2 | 3/2010 | Battat et al. | |
| 7,689,412 B2* | 3/2010 | Wu et al. | 704/10 |
| 7,730,034 B1 | 6/2010 | Deflaux et al. | |
| 7,739,290 B2 | 6/2010 | Rossmann | |
| 8,055,529 B1* | 11/2011 | Jackson et al. | 705/7.29 |
| 8,234,106 B2* | 7/2012 | Marcu et al. | 704/2 |
| 2002/0133509 A1* | 9/2002 | Johnston et al. | 707/203 |
| 2004/0002960 A1 | 1/2004 | Drake et al. | |
| 2004/0122656 A1* | 6/2004 | Abir | 704/4 |
| 2006/0047665 A1* | 3/2006 | Neil | 707/10 |
| 2006/0155960 A1* | 7/2006 | Okada | 712/203 |
| 2007/0208832 A1* | 9/2007 | Traub et al. | 709/220 |
| 2009/0024613 A1* | 1/2009 | Niu et al. | 707/5 |
| 2009/0182547 A1* | 7/2009 | Niu et al. | 704/2 |
| 2009/0271472 A1* | 10/2009 | Scheifler et al. | 709/202 |
| 2009/0300578 A1* | 12/2009 | Neil | 717/104 |
| 2010/0082646 A1* | 4/2010 | Meek et al. | 707/752 |
| 2010/0121829 A1* | 5/2010 | Bendig | 707/703 |
| 2010/0122239 A1* | 5/2010 | Neufeld et al. | 717/131 |
| 2010/0145962 A1* | 6/2010 | Chen et al. | 707/758 |
| 2010/0175044 A1 | 7/2010 | Doddavula et al. | |
| 2010/0198948 A1* | 8/2010 | Yang et al. | 709/222 |
| 2010/0211939 A1 | 8/2010 | Ali | |
| 2011/0060845 A1* | 3/2011 | Jungck | 709/245 |
| 2012/0078865 A1 | 3/2012 | Channing et al. | |

OTHER PUBLICATIONS

Dynamicjava.org, "Dynamic-JPA Overview", [online], [retrieved on Sep. 10, 2010], retrieved from the Internet at <URL: http://www.dynamicjava.org/projects/dynamic-jpa>, 6 pp.

Hrivnac, J., "Transparent Persistence with Java Data Objects", Computing in High Energy and Nuclear Physics, Mar. 2003, In Proceedings of the Conference for Computing in High Energy and Nuclear Physics, Mar. 24-28, 2003, 10pp.

IBM Corp., "Pluggable Event Persistence Infrastructure for Use in a J2CA Adapter Capable of Running in Multiple Environments", IPCOM000166592D, Jan. 17, 2008, 4 pp.

IBM Corp., "System and Method to Enable Dynamic Configuration of Software Building Artifacts", IPCOM000144127D, Dec. 19, 2006, 6 pp.

Iyer, A.C., "Persistent Object Service Framework Using Component Configuration Model", Thesis for Master of Science in Computer Science, 1999, 49 pp.

King, G., C. Bauer, M.R. Andersen, E. Bernard, and S. Ebersole, "HIBERNATE—Relational Persistence for Idiomatic Java", Chapter 3. Configuration, © 2004 Red Hat Middleware, LLC, [online], [Retrieved on Sep. 10, 2010], retrieved from the Internet at <URL: http://docs.jboss.org/hibernate/core/3.3/reference/en/html/session-configuration.html>, 20 pp.

"Mybatis 3", User Guide, [online] May 29, 2010, Retrieved from the Internet at <URL: http://mybatis.googlecode.com/svn/trunk/doc/en/MyBatis-3-User-Guide.pdf>, 64 pp.

Amendment 2, May 28, 2013, for U.S. Appl. No. 12/894,045, filed Sep. 29, 2010 by C.E. Channing et al., Total 12 pp. [57.231 (Amend2)].

Amendment 1, Aug. 31, 2012, for U.S. Appl. No. 12/894,045, filed Sep. 29, 2010 by C.E. Channing et al., Total 12 pp. [57.231 (Amend1)].

Final Office Action 1, Feb. 28, 2013, for U.S. Appl. No. 12/894,045, filed Sep. 29, 2010 by C.E. Channing et al., Total 19 pp. [57.231 (FOA1)].

Office Action 1, Jun. 7, 2012, for U.S. Appl. No. 12/894,045, filed Sep. 29, 2010 by C.E. Channing et al., Total 28 pp. [57.231 (OA1)].

Amendment 3, Mar. 3, 2014, for U.S. Appl. No. 12/894,045, filed Sep. 29, 2010 by C.E. Channing et al., Total 12 pp. [Amend3 (57.231)].

Office Action 3, Dec. 3, 2013, for U.S. Appl. No. 12/894,045, filed Sep. 29, 2010 by C.E. Channing et al., Total 29 pp. [OA3 (57.231)].

Final Office Action 2, Jun. 19, 2014, for U.S. Appl. No. 12/894,045, filed Sep. 29, 2010 by C.E. Channing et al., Total 27 pp. [57.231 (FOA2)].

Response to Office Action 2, Sep. 17, 2014, for U.S. Appl. No. 12/894,045, filed Sep. 29, 2010 by C.E. Channing et al., Total 12 pp. [57.231 (RFOA2)].

Notice of Allowance 1, Oct. 7, 2014, for U.S. Appl. No. 12/894,045, filed on Sep. 29, 2010 by C.E. Channing et al., Total 12 pp. [57.231 (NOA1)].

* cited by examiner

DYNAMIC CONFIGURATION OF A PERSISTENCE PROVIDER

CROSS-REFERENCE TO RELATED APPLICATIONS

This application is a continuation of and claims the benefit of U.S. patent application Ser. No. 12/894,045, filed Sep. 29, 2010, which application is incorporated herein by reference in its entirety.

BACKGROUND

1. Field

Embodiments of the invention relate to dynamic configuration of a persistence provider.

2. Description of the Related Art

Object-Relational Mapping (ORM) may be described as a programming technique for converting data between application level object types implemented with object-oriented programming languages and physical data structure types, such as tables. A persistence provider may be described as performing such mapping of application level object types defined under a persistence object model that an application processes with physical data structure types defined under a physical data model (e.g., database object types in a database). The configuration of a persistence provider relies on metadata that defines the bindings between the persistence object model and the physical data model (e.g., the database).

A current problem with existing persistence providers is that they require static configuration and remain immutable once initialized. That is, as long as an application is executing, a persistence provider that is mapping underlying object structures for the application remains unchanged. For example, if a new application level object type or database object type (i.e. a table) is created during the execution of an application, then, current persistence provider implementations are not able to map the application level object type to the database object type (because the persistence provider is not able to dynamically use the updated mapping information). In order for the persistence provider to be able to map the new object type, the application execution must be stopped, the persistence provider is updated to have the new mapping information for the new object type, and the application is restarted.

Some conventional systems may require that users create a custom data model at runtime to store dynamic data. However, the application is still forced to restart, causing the persistence provider to be reinitialized.

Figure 1:
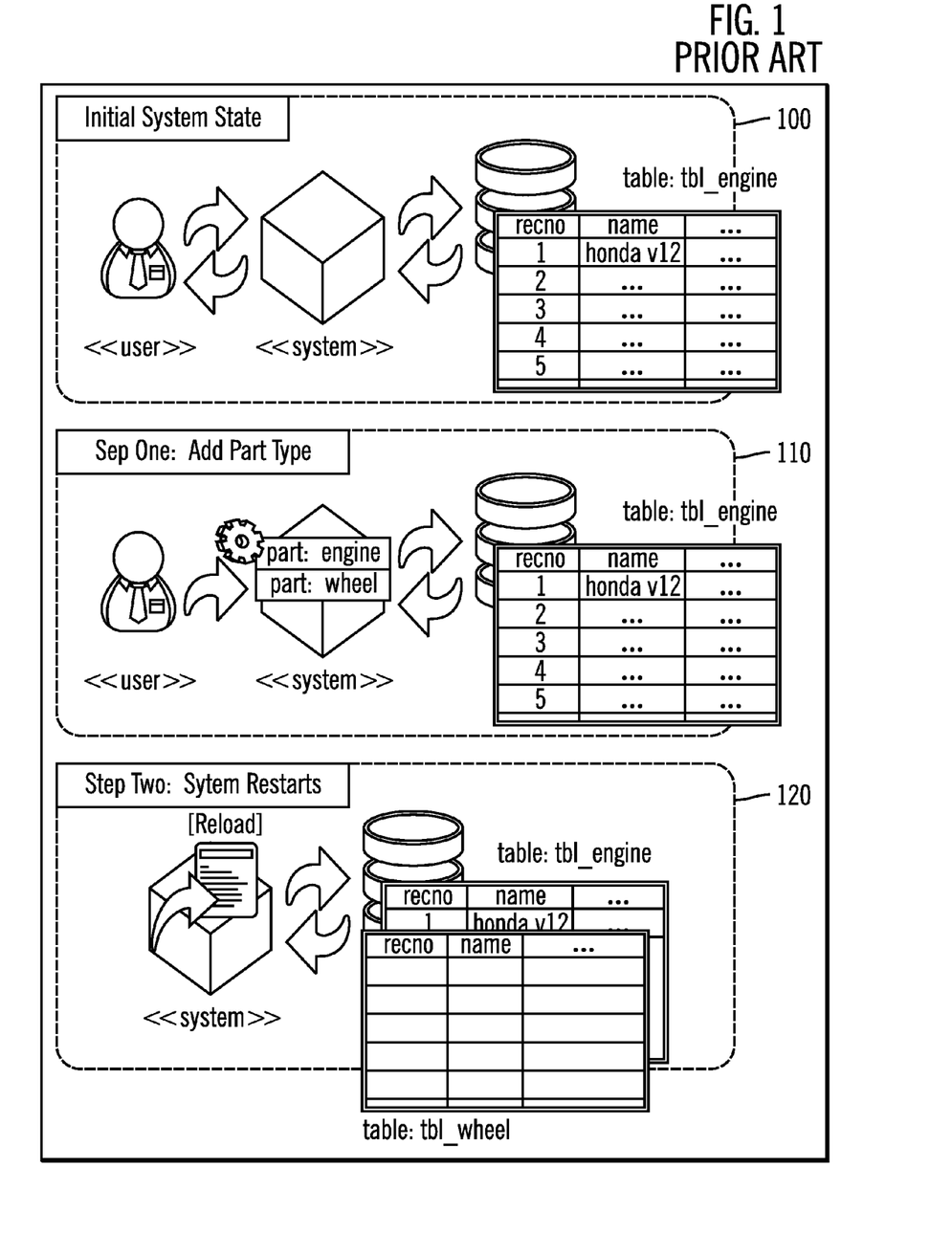
FIG. 1 illustrates, in a block diagram, a prior art persistence technology in the context of existing persistence providers.

FIG. 1 illustrates, in a block diagram, a prior art persistence technology in the context of existing persistence providers. The initial system state 100 defines one automotive part, which is an engine object that maps to the tbl_engine table in the database. The user (e.g., via an application) is able to retrieve information about this part using the configured persistence provider. In state 110, the user (e.g., via the application) adds a new automotive part type for a wheel object. The computer system updates metadata within the metadata model to include the new part type and updates the static persistence configuration. The state of the persistence provider does not reflect the updated metadata as the application has to be restarted for the persistence provider to be reinitialized with the changes. In state 120, after the application restarts, the persistence provider is able to map between the automotive parts, which are the engine object type and the wheel object type, and their respective tables, tbl_engine and tbl_wheel.

Thus, there is a need for dynamic reconfiguration of the persistence provider which does not require the application execution flow to be interrupted

BRIEF SUMMARY

Provided are a method, computer program product, and system for updating a physical data structure type. A persistence provider is updated with dynamic configuration data for the updated physical data structure type while an application is executing. The application that is executing is allowed to access the updated physical data structure type using the updated persistence provider to map an application level object type to the updated physical data structure type without restarting the application.

BRIEF DESCRIPTION OF THE SEVERAL VIEWS OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments facilitate the dynamic reconfiguration of a persistence provider at runtime (prompted by changes to underlying configuration data (e.g., metadata)) without requiring a restart of the application. For example, with reference FIG. 1, state 120 would not require an application restart, but, instead cause the configuration data for the persistence provider to be reloaded at runtime, thus, enabling the application immediate access to the new automotive part type (the "wheel" object).

Figure 2:
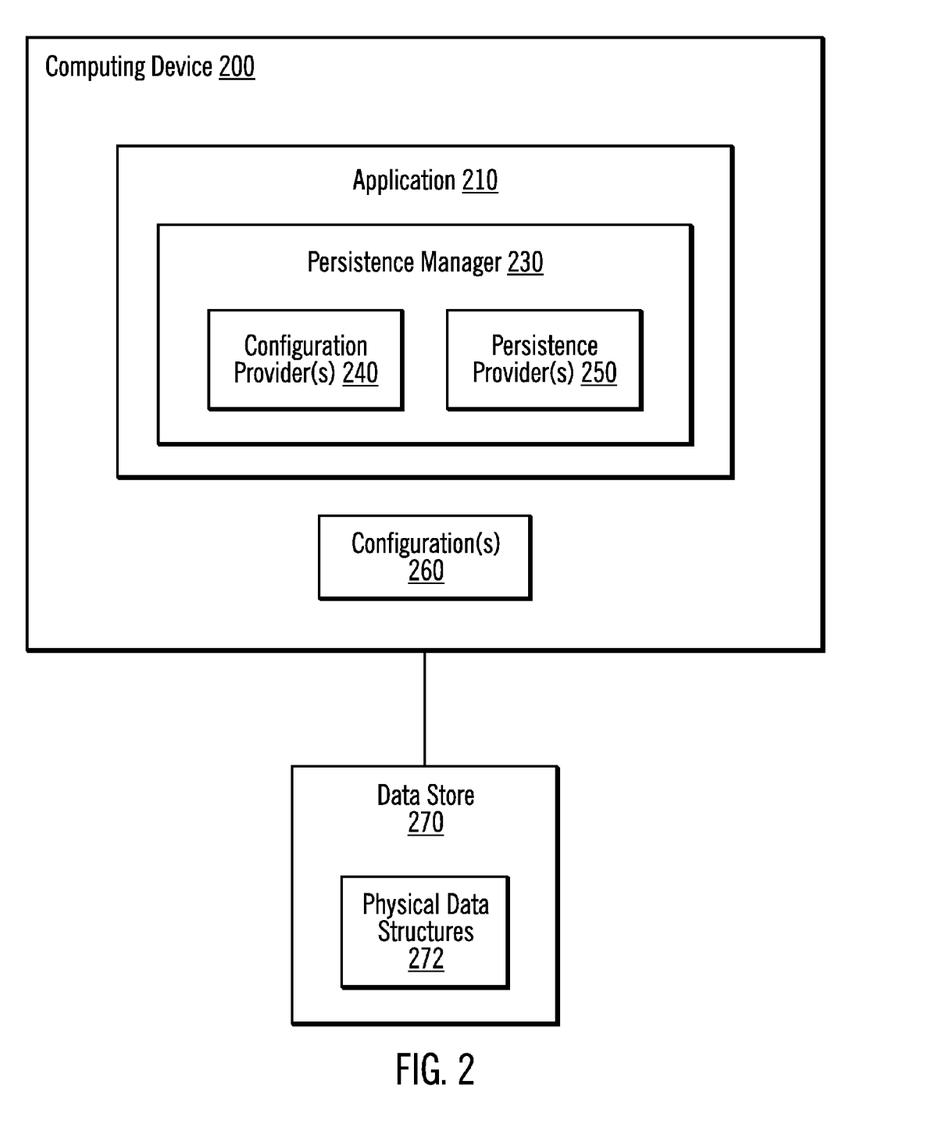
FIG. 2 illustrates, in a block diagram, a computing architecture in accordance with certain embodiments.

FIG. 2 illustrates, in a block diagram, a computing architecture in accordance with certain embodiments. A computing device 200 includes an application 210 and one or more configurations 260. The configurations 260 include configuration data (e.g., static and/or dynamic configuration data). Although one application 210 is illustrated, there may be any number of applications that may execute on the computing device 200. The application 210 includes a persistence manager 230. The persistence manager 230 includes one or more configuration providers 240 and one or more persistence providers 250. In certain embodiments, a persistence provider may be an underlying persistence factory. The persistence manager 230 is responsible for invoking the required configuration providers 240 to obtain the configurations 250 for creating and maintaining a persistence provider 250. In certain embodiments, the persistence manager 230 wraps around the persistence provider 250 to manage access to the persistence provider 250.

The computing device 200 is coupled to a data store 270, which stores physical data structures 272. The physical data structures 272 may be files, tables, indexes, etc. In certain embodiments, a data store 270 is a database.

Embodiments define a framework for dynamically generating and loading the configurations 260 at runtime for a given persistence provider 250. A configuration provider interface is used to abstract the configuration 260 loading/generation process. In certain embodiments, the implementation of the configuration provider interface is delegated to vendors, and, therefore, such embodiments do not dictate where the configuration 260 comes from. In embodiments, various techniques may be used to collect the dynamic configuration data, and the dynamic configuration data for the logical structure may be different for different vendors. In certain embodiments, the implementation of the persistence provider is vendor specific.

With the framework, logical metadata for each physical data structure type (e.g., dynamic resource or any component that can be described as a type in the data store 270, for example, a type of a database object) is made available to define the underlying configuration 260 used by the persistence provider 250. The configuration 260 includes configuration data, such as, the following attributes for a table type: a table name and, for each column, a column name, a column type, a key indicator, and an index indicator.

Figure 3:
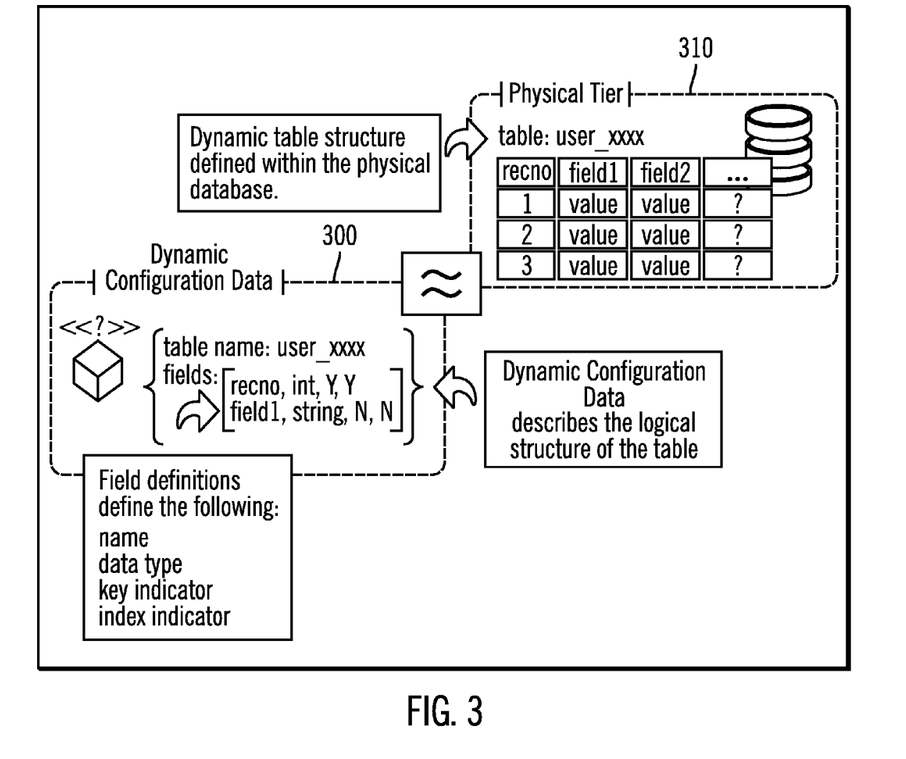
FIG. 3 illustrates, in a block diagram, a relationship between dynamic configuration data and a physical tier in accordance with certain embodiments.

FIG. 3 illustrates, in a block diagram, a relationship between dynamic configuration data and a physical tier in accordance with certain embodiments. In the dynamic configuration data 300, field definitions define name, data type, key indicator, and index indicator. The dynamic configuration data 300 describes the dynamic table structure defined within the physical tier 310.

Figure 4:
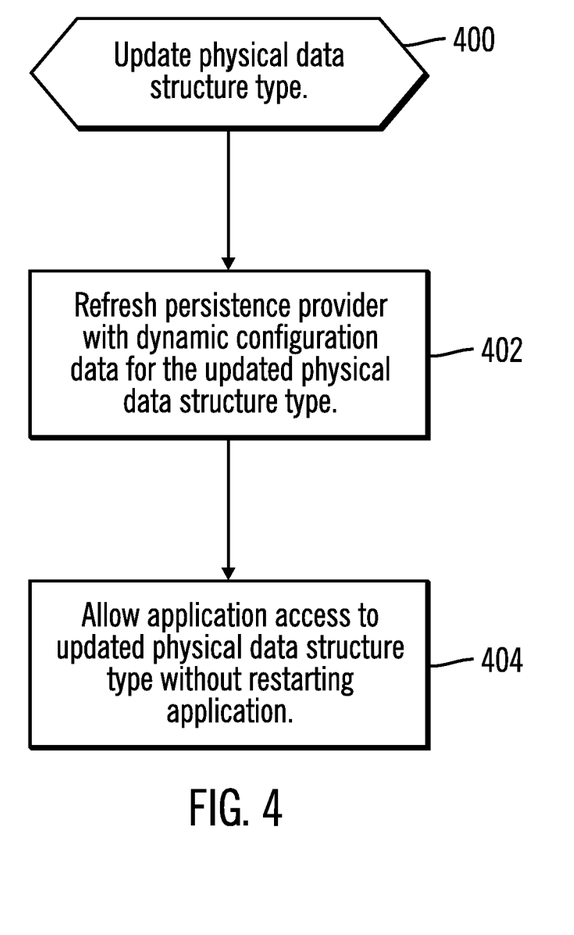
FIG. 4 illustrates, in a flow diagram, logic performed when a physical data structure type is updated in accordance with certain embodiments.

FIG. 4 illustrates, in a flow diagram, logic performed when a physical data structure type is updated in accordance with certain embodiments. Control begins at block 400 with the physical data structure type being updated (e.g., created or modified) in the data store 270 (e.g., by a user, application or process). In block 402, the persistence manager 230 refreshes the persistence provider 250 with dynamic configuration data for the updated physical data structure type. The configuration data describes a mapping between an application level object type and the updated physical data structure type. In block 404, the application 210 is allowed access to the updated physical data structure type to map an application level object type to the updated physical object type without restarting the application 210

Figure 5:
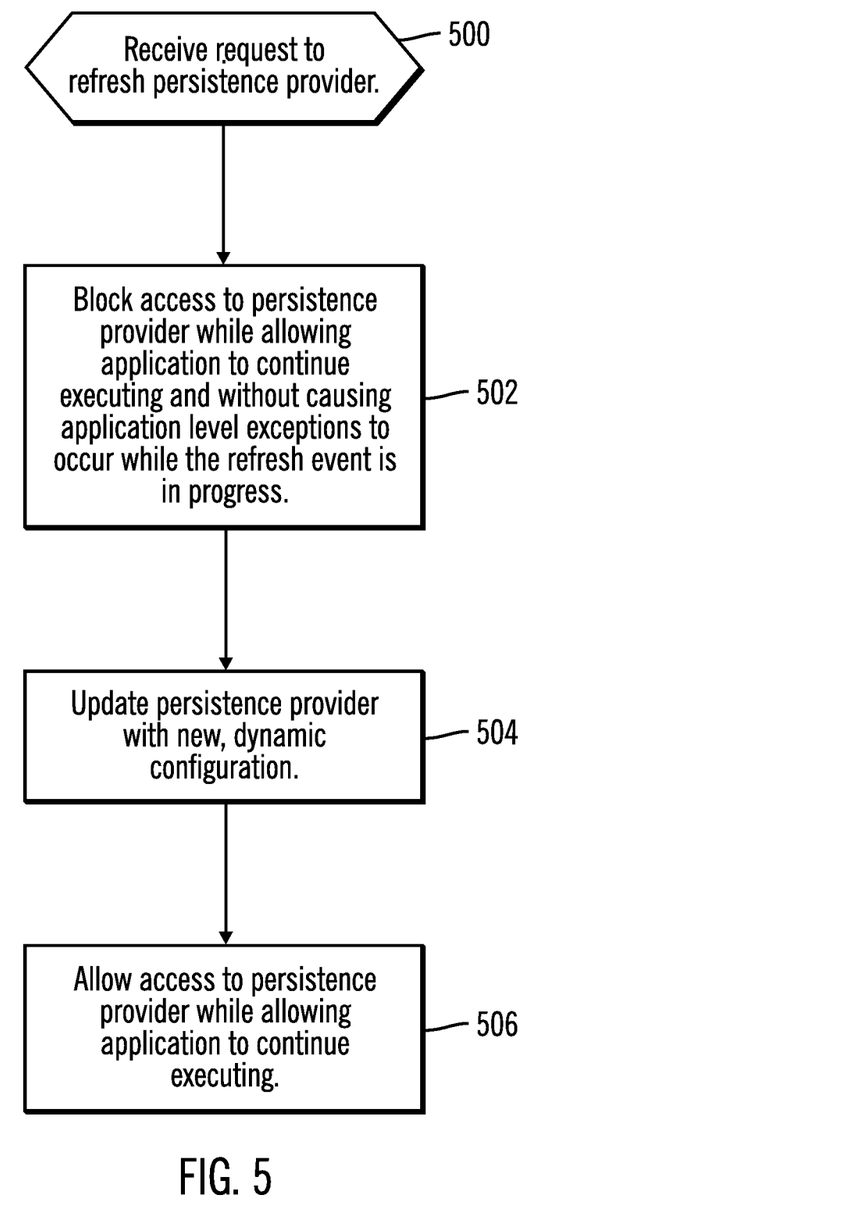
FIG. 5 illustrates, in a flow diagram, logic performed by a persistence manger upon receipt of a refresh event in accordance with certain embodiments.

FIG. 5 illustrates, in a flow diagram, logic performed by the persistence manger 230 upon receipt of a refresh event in accordance with certain embodiments. Control begins at block 500 with the persistence manager 230 receiving the request to refresh the persistence provider 250. In block 502, the persistence manager 230 blocks access to the persistence provider 250 while allowing the application 210 to continue executing and without causing application level exceptions to occur while the refresh event is in progress.

In block 504, the persistence manager 230 updates the persistence provider 250 with a new, dynamic configuration 260. In block 506, the persistence manager 230 allows access (e.g., for another refresh event) to the persistence provider 250, while allowing the application to continue executing.

The following is an example of a persistence provider configuration that could be derived from application level metadata that illustrates one possible technique for mapping engine and wheel objects to corresponding elements in the data store 270 in accordance with certain embodiments:

```
<mapping>
   <class name="example.Engine" table="engine">
      <id name="id" column="id" type="integer"/>
      <property name="type" column="type" type="string"/>
      <property name="cylinders" column="cylinders" type="integer"/>
   </class>
   <class name="example.Wheel" table="wheel">
      <id name="id" column="id" type="integer"/>
      <property name="diameter" column="diameter" type="integer"/>
      <property name="color" column="color" type="string"/>
   </class>
</mapping>
```

Figure 6:
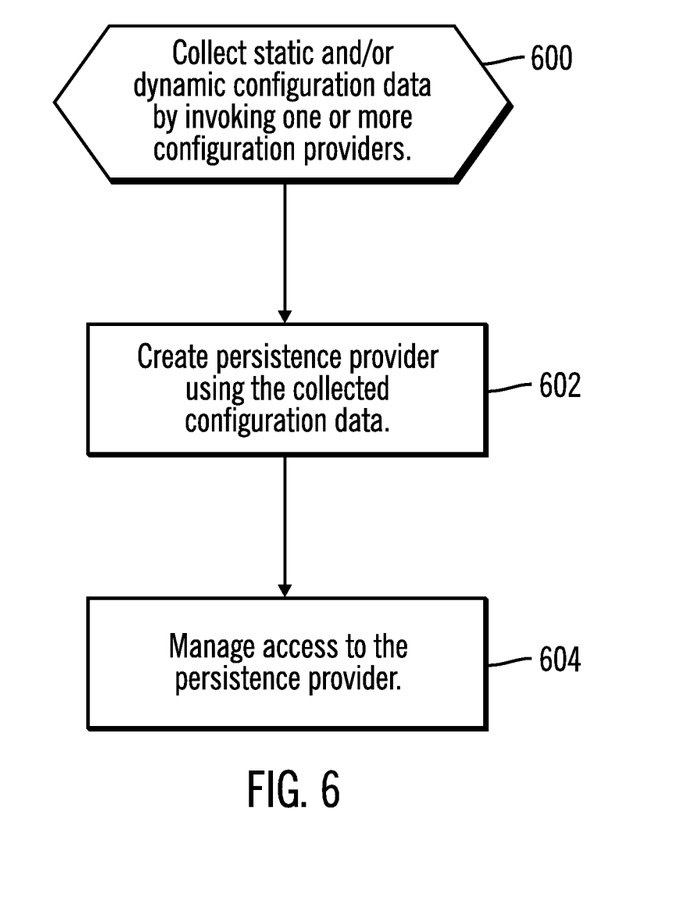
FIG. 6 illustrates, in a flow diagram, logic performed by a persistence manager in accordance with certain embodiments.

FIG. 6 illustrates, in a flow diagram, logic performed by the persistence manager 230 in accordance with certain embodiments. Control begins at block 600 with the persistence manager 230 collecting static and/or dynamic configuration data by invoking one or more configuration providers 240. A configuration provider interface is used to abstract the implementation detail for gathering the underlying persistence provider configuration for the physical data structures 272. The configuration provider may be described as a common interface that can be used to abstract how and where actual configuration data is retrieved for a given persistence provider 250. For example, the configuration provider interface is called "ConfigurationProvider" in FIG. 8. Each configuration provider 240 consumes configuration data to provide the dynamic configuration for the persistence provider 250. In various embodiments, there may be numerous configuration providers 240 that are managed by the persistence manager 230.

Figure 8:
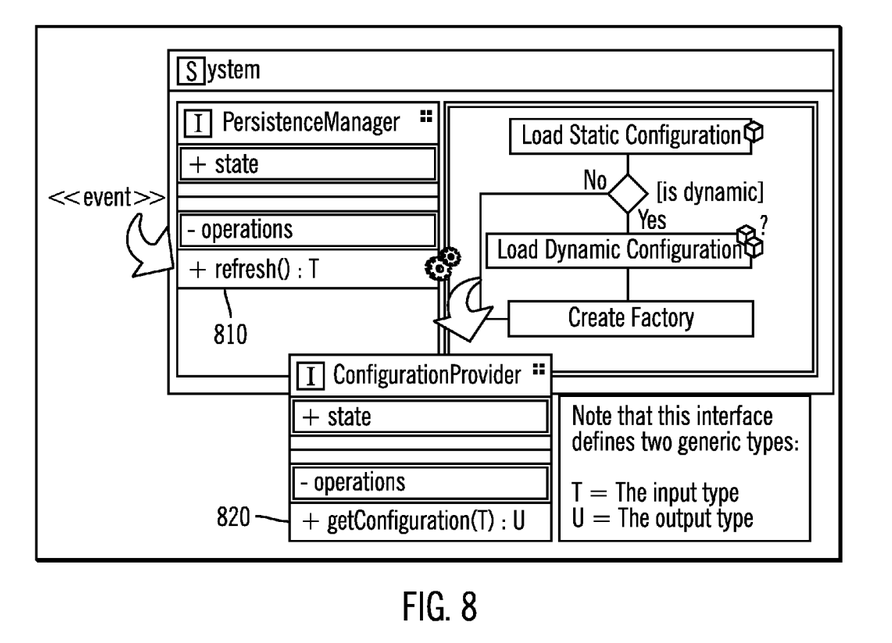
FIG. 8 illustrates, in a block diagram, a relationship between a persistence manager and a configuration provider in accordance with certain embodiments.

In certain embodiments, the persistence manager 230 and configuration providers 260 use interfaces, such as "PersistenceManager" and "ConfigurationProvider" shown in FIG. 8. In block 602, the persistence manager 230 creates a persistence provider 250 using the collected configuration data. In block 604, the persistence manager 230 maintains access to the persistence provider 250. For example, the persistence manger 230 enables a user, application or process to modify (e.g., change, delete, etc.) the persistence provider 250 or refresh a persistence provider 250 with the persistence provider 250.

Figure 7:
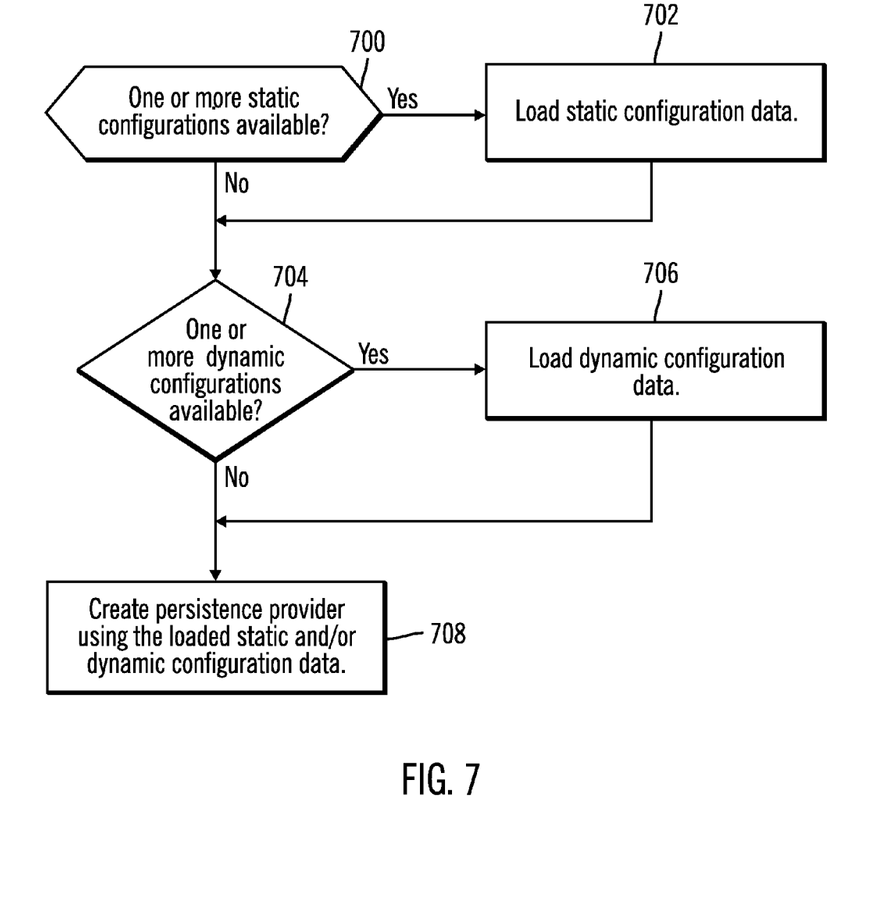
FIG. 7 illustrates, in a flow diagram, logic performed by a persistence manager to collect configuration data and create the persistence provider in accordance with certain embodiments.

FIG. 7 illustrates, in a flow diagram, logic performed by the persistence manager 230 to collect configuration data and create the persistence provider 250 in accordance with certain embodiments. Control begins at block 700 with the persistence manager 230 determining whether there are one or more static configurations 260. If so, processing continues to block 702, otherwise, processing continues to block 704. In block 702, the persistence manager 230 loads static configuration data from the one or more static configurations 260 by invoking the one or more configuration providers 240.

In block 704, the persistence manager 230 determines whether there are one or more dynamic configurations 260. If so, processing continues to block 706, otherwise, processing continues to block 708. In block 706, the persistence manager 230 loads dynamic configuration data from the one or more dynamic configurations 260 by invoking the one or more configuration providers 240. In block 708, the persistence manager 230 creates the persistence provider 250 using the loaded static and/or dynamic configuration data.

FIG. 8 illustrates, in a block diagram, a relationship between the persistence manager 230 and a configuration provider 240 in accordance with certain embodiments. The persistence manager 230 receives a "refresh" event 810 via the interface "PersistenceManager". Then, the persistence manager 230 invokes each configuration provider 260 by calling getConfiguration(T): U 820 from the interface "ConfigurationProvider" of each configuration provider 260. During the refresh event 810, any request made to access the persistence provider 250 is blocked until the refresh is complete. By accessing the persistence provider 250 through the persistence manager 230, embodiments avoid the risk of accessing a stale persistence provider 250.

Embodiments provide a framework that is simple to use and easy to integrate to any software system that uses a persistence provider. The integration of the framework involves implementing the one or more configuration providers 240 and the persistence manager 230, which will centralize the persistence provider configuration 260 and centralize access to the persistence provider 250.

Thus, unlike conventional systems that require a restart of an application to add in new physical data structure types, embodiments dynamically integrate new physical data structure types without interrupting the application execution flow. Thus, new data structure types are dynamically available to the application.

Thus, embodiments dynamically reload object relational mapping persistence configuration when changes occur to the meta model. Embodiments provide the ability to use dynamic metadata representing objects within the persistence layer. Embodiments dynamically reconfigure the persistence provider using configuration providers and protect access to the persistence provider during runtime reconfiguration.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational processing (e.g., operations or steps) to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Figure 9:
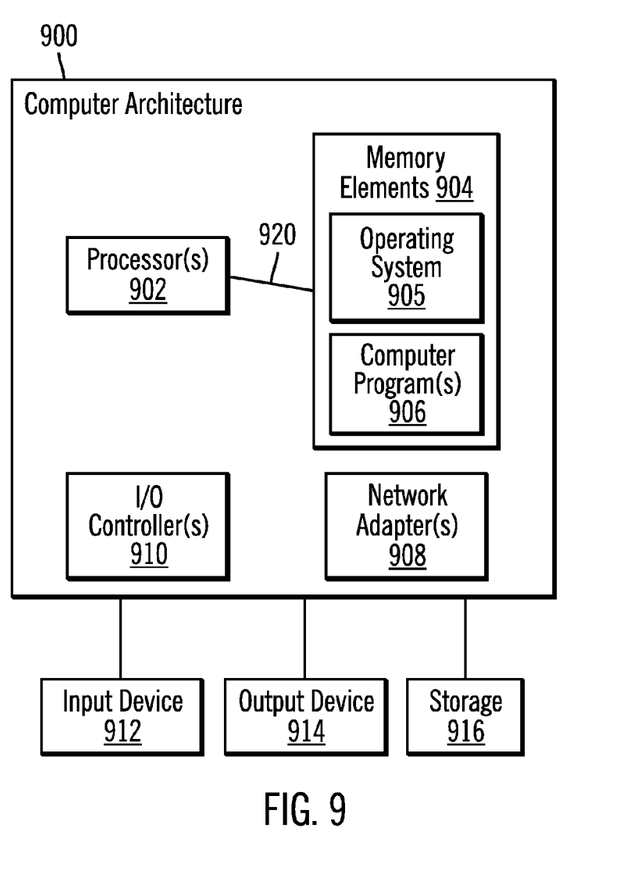
FIG. 9 illustrates, in a block diagram, a computer architecture that may be used in accordance with certain embodiments.

FIG. 9 illustrates, in a block diagram, a computer architecture 900 that may be used in accordance with certain embodiments. Computing device 200 may implement computer architecture 900. The computer architecture 900 is suitable for storing and/or executing program code and includes at least one processor 902 coupled directly or indirectly to memory elements 904 through a system bus 920. The memory elements 904 may include local memory employed during actual execution of the program code, bulk storage, and cache memories which provide temporary storage of at least some program code in order to reduce the number of times code must be retrieved from bulk storage during execution. The memory elements 904 include an operating system 905 and one or more computer programs 906.

Input/Output (I/O) devices 912, 914 (including but not limited to keyboards, displays, pointing devices, etc.) may be coupled to the system either directly or through intervening I/O controllers 910.

Network adapters 908 may also be coupled to the system to enable the data processing system to become coupled to other data processing systems or remote printers or storage devices through intervening private or public networks. Modems, cable modem and Ethernet cards are just a few of the currently available types of network adapters 908.

The computer architecture 900 may be coupled to storage 916 (e.g., a non-volatile storage area, such as magnetic disk drives, optical disk drives, a tape drive, etc.). The storage 916 may comprise an internal storage device or an attached or network accessible storage. Computer programs 906 in storage 916 may be loaded into the memory elements 904 and executed by a processor 902 in a manner known in the art.

The computer architecture 900 may include fewer components than illustrated, additional components not illustrated herein, or some combination of the components illustrated and additional components. The computer architecture 900 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The invention claimed is:

1. A method, comprising:
providing, using a processor of a computer, a persistence provider that maps application level object types defined under a persistence object model that an application processes with physical data structure types defined under a physical data model for a database; and
while an application that includes the persistence provider continues to execute, dynamically updating the persistence provider at runtime to access a new object of an application level object type by:
adding, using a processor of a computer, a data element of a physical data structure type defined under the physical data model, wherein the physical data structure type is a type of a database object;
obtaining dynamic configuration data that describes a structure of the added data element of the physical data structure type and that provides a mapping between the added data element of the physical data structure type and a new object of the application level object type defined under the persistence object model;

in response to receiving a refresh event to update the persistence provider, updating the persistence provider with the dynamic configuration data for the added data element of the physical data structure type and with the mapping; and accessing, with the application, the added data element of the physical data structure type using the updated persistence provider to map the new object of the application level object type to the added data element of the physical data structure type.

2. The method of claim 1, further comprising:
in response to receiving the refresh event to update the persistence provider, blocking access to the persistence provider used by the application until the refresh operation completes while allowing the application to continue executing and without causing application level exceptions to occur while the refresh event is in progress.

3. The method of claim 2, further comprising:
in response to updating the persistence provider, allowing access to the updated persistence provider.

4. The method of claim 1, further comprising:
under control of a persistence manager,
collecting the dynamic configuration data by invoking one or more configuration providers, wherein each of the one or more configuration providers consumes configuration data to provide the dynamic configuration data; and
creating the persistence provider using the collected, dynamic configuration data.

5. The method of claim 4, wherein each of the one or more configuration providers implements a configuration provider interface, and wherein an implementation of each configuration provider interface is vendor specific.

6. The method of claim 1, wherein an implementation of the persistence provider is vendor specific.

7. The method of claim 1, wherein a persistence manager wraps around the persistence provider to manage access to the persistence provider.

* * * * *